United States Patent Office 2,920,106
Patented Jan. 5, 1960

2,920,106

PARTIAL OXIDATION OF ALKYL AROMATICS

Ivor W. Mills, Glenolden, Pa., assignor to Sun Oil Company, Philadelphia, Pa., a corporation of New Jersey No Drawing. Application July 26, 1957
Serial No. 674,280

4 Claims. (Cl. 260—524)

This invention relates to the partial oxidation of alkyl aromatic compounds to produce carboxyl-containing compounds, and more particularly to a manner of promoting reactivity of alkyl groups in such oxidation.

It is known in the art to partially oxidize alkyl aromatic compounds in liquid phase by means of a free-oxygen containing gas. The reactivity of alkyl groups in such processes is often unsatisfactorily low. This is particularly true in certain oxidations such as the oxidation of toluic acid to phthalic acid, or in oxidation of xylene to phthalic acid, the second methyl group being more difficult to react than the first methyl group.

According to the present invention, a novel manner is provided of increasing the reactivity of alkyl groups in processes as described previously. This is accomplished by performing the oxidation in the presence of added elemental sulfur. The added sulfur reacts under the oxidation conditions with an alkyl group or groups in the oxidation charge stock to produce, as one product, hydrogen sulfide and, as a second product, an unstable dehydrogenation product derived from the charge stock by removal of hydrogen from an alkyl group or groups therein. This dehydrogenation product is particularly susceptible to oxidation, under the conditions prevailing in the reaction medium, with ultimate formation of carboxyl groups. The mechanism of the process thus probably involves dehydrogenation of an alkyl group in the charge stock to produce an intermediate group which reacts with oxygen to produce a carboxyl group.

The hydrogen sulfide which is produced is converted to a large extent to elemental sulfur under the conditions prevailing in the oxidation zone, this sulfur being formed as a result of oxidation of the hydrogen sulfide by means of oxygen gas in the reaction medium. Any hydrogen sulfide which does not thus react to form elemental sulfur can be removed with other vaporous materials from the reaction zone, separated from other constituents of the vaporous materials, and recycled to the oxidation zone. Alternatively the hydrogen sulfide can be permanently removed from the system, or converted by any suitable known oxidation process to elemental sulfur in a separate zone and the elemental sulfur returned to the oxidation zone.

Since to a large extent the elemental sulfur which is employed in the process according to the invention is regenerated in the oxidation zone by oxidation of hydrogen sulfide, the amount of elemental sulfur to be added to the oxidation zone is generally less than the stoichiometric amount needed to remove two atoms of hydrogen from the oxidation charge stock and form hydrogen sulfide. Usually the amount of sulfur added will be less than one-half mole per mole of charge stock, and preferably less than 0.1 mole, e.g. 0.005 to 0.1 mole, per mole of charge stock.

The process according to the invention can be carried out either by adding sulfur as such to the oxidation zone, this type of operation being preferred, or by adding hydrogen sulfide to the oxidation zone, the added hydrogen sulfide being converted to elemental sulfur under the conditions prevailing in the oxidation zone.

It is essential according to the invention that free-oxygen containing gas be employed in the oxidation reaction. The amount should be at least a stoichiometric amount for the desired reaction, and the amount is preferably considerably greater than the stoichiometric amount. The amounts of oxygen employed can be generally those which are used in conventional partial oxidation of alkyl aromatic compounds to carboxyl-containing compounds.

Preferably, an oxidation catalyst is employed in the process according to the invention, though it is within the scope of the invention to omit such catalyst. The preferred catalysts are the well known metallic oxidation catalysts constituting compounds of metals such as cobalt, manganese, lead, iron, cerium, nickel, copper, chromium, etc., such compounds including for example the oxides, hydroxides, acetates, toluates, naphthenates, oleates, acetylacetonates, etc. Any suitable free-oxygen containing gas can be employed according to the invention, e.g. air, pure oxygen or oxygen in admixture with various inert gases. Such oxidizing agents are well known in the art.

The oxidation is preferably carried out at a pressure within the range from atmospheric pressure to 500 p.s.i.g., although it is within the scope of the invention to perform the oxidation at other pressures. The temperature is within the approximate range from 250 to 500° F., preferably 250 to 400° F. The oxidation can be performed by batch or continuous methods.

The process of the present invention is applicable generally to liquid phase partial oxidations of alkyl aromatic compounds. Such oxidations are known in the art and include such processes as oxidation of alkyl aromatic hydrocarbons, e.g. individual xylene isomers or mixtures thereof, to produce corresponding monocarboxylic or polycarboxylic acids, oxidation of monobasic aromatic acids such as toluic acids, or esters or salts of such acids, to produce dibasic acids such as phthalic acids, etc. Typical procedures for oxidation of xylenes to toluic acids are disclosed for example in C. M. Himel et al. United States Patent No. 2,712,551, July 5, 1955. Typical procedures for oxidation of xylenes to phthalic acids are disclosed for example in British Patent No. 623,836, May 24, 1949. The process of the invention is applicable to such procedures and other known procedures for partial oxidation of alkyl aromatic compounds.

The following example illustrates the invention:

Liquid phase oxidation of m-xylene is performed at 300° F. and 10 p.s.i.g. in the presence of a cobalt naphthenate catalyst in amount to provide about 0.05 weight percent of cobalt based on xylene. Substantially pure oxygen gas is employed as the oxidizing agent, in amount to provide over the total oxidation period an average of about 12 moles of oxygen per mole of xylene. The oxidation is performed in the presence of 0.05 mole of elemental sulfur per mole of xylene. The sulfur reacts with the methyl groups in the xylene to form $H_2S$ and unstable dehydrogenation products of the xylene, which products are highly reactive with oxygen to produce isophthalic acid. A portion of the hydrogen sulfide which is formed reacts with oxygen to form elemental sulfur and water.

The oxidation is performed by bubbling oxygen through a body of liquid oxidation medium. The vaporous materials are separated from the upper surface of the liquid oxidation medium and passed to condensing apparatus for condensation of vaporized xylene and other normally liquid materials. The condensate is returned to the oxidation zone. Periodically, a portion of the oxidation medium containing isophthalic acid is removed from the oxidation zone and filtered to remove isophthalic acid, and the filtrate is returned to the oxidation zone. A highly satisfactory rate of oxidation of m-xylene to isophthalic acid is provided as a result of the formation, by reaction of elemental sulfur with xylene, of materials having particularly great reactivity with oxygen to form isophthalic acid.

Generally similar results are obtained in other oxidations within the scope of the invention, e.g. oxidation of p-xylene to terephthalic acid, oxidation of mixtures of m-xylene and p-xylene to mixtures of isophthalic acid and terephthalic acid, oxidation of m-toluic acid to isophthalic acid, etc. The beneficial effect of the presence of sulfur is obtained in noncatalytic as well as in catalytic oxidations.

The invention claimed is:

1. Process for partially oxidizing alkyl aromatic compounds which comprises contacting, in the liquid phase, reactants consisting essentially of an alkyl aromatic compound containing a difficultly oxidizable methyl group, free-oxygen containing gas and elemental sulfur at a temperature within the approximate range from 250 to 500° F. and at a pressure below the vapor pressure of water at said temperature, the amount of elemental sulfur being less than the stoichiometric amount needed to remove two atoms of hydrogen from the oxidation charge stock and form hydrogen sulfide, thereby to produce aromatic carboxylic acid by partial oxidation of said difficultly oxidizable methyl group.

2. Process according to claim 1 wherein said alkyl aromatic compound comprises a toluic acid.

3. Process according to claim 1 wherein said alkyl aromatic compound comprises a xylene, and wherein the oxidation product is a benzene dicarboxylic acid.

4. Process according to claim 1 wherein said temperature is not greater than 400° F., and said contacting is performed at a pressure within the approximate range from atmospheric pressure to 500 p.s.i.g.

References Cited in the file of this patent

UNITED STATES PATENTS

| | | |
|---|---|---|
| 2,587,666 | Toland | Mar. 4, 1952 |
| 2,712,551 | Himel et al. | July 5, 1955 |
| 2,809,204 | McKinnis | Oct. 8, 1957 |

FOREIGN PATENTS

| | | |
|---|---|---|
| 623,836 | Great Britain | May 24, 1949 |